(12) United States Patent
James et al.

(10) Patent No.: US 7,692,000 B2
(45) Date of Patent: Apr. 6, 2010

(54) HYALURONAN (HA) ESTERIFICATION VIA ACYLATION TECHNIQUE FOR MOLDABLE DEVICES

(75) Inventors: Susan P. James, Bellvue, CO (US); Min Zhang, Seattle, WA (US)

(73) Assignee: Colorado State University Research Foundation, Fort Collins, CO (US)

( * ) Notice: Subject to any disclaimer, the term of this patent is extended or adjusted under 35 U.S.C. 154(b) by 1030 days.

(21) Appl. No.: 10/571,662

(22) PCT Filed: Sep. 20, 2004

(86) PCT No.: PCT/US2004/030666

§ 371 (c)(1),
(2), (4) Date: Mar. 10, 2006

(87) PCT Pub. No.: WO2005/028632

PCT Pub. Date: Mar. 31, 2005

(65) Prior Publication Data

US 2006/0281912 A1    Dec. 14, 2006

(51) Int. Cl.
*C08B 37/00* (2006.01)
(52) U.S. Cl. ........................................ 536/53
(58) Field of Classification Search .................... 536/53
See application file for complete search history.

(56) References Cited

U.S. PATENT DOCUMENTS 4,851,521 A * 7/1989 della Valle et al. ......... 536/55.1
5,644,049 A * 7/1997 Giusti et al. ................. 536/53

* cited by examiner

*Primary Examiner*—Shaojia Anna Jiang
*Assistant Examiner*—Ganapathy Krishnan
(74) *Attorney, Agent, or Firm*—Heslin Rothenberg Farley & Mesiti P.C.; Andrew K. Gonsalves

(57) ABSTRACT

A series of novel, melt- or mold-processable HA esters with varying aliphatic chain lengths are synthesized from silyl HA-quaternary (quat.) ammonium salt complex (preferably silyl HA-CTA, a silylated HA complex with cetyltrimethyl ammonium salt). Introduction of aliphatic acyl groups, preferably acid chlorides, to disrupt the strong HA intermolecular bonding, is done via acylation. Acylation takes place at the oxygen of the trimethylsilyloxy group —O—Si(CH$_3$)$_3$ in the silyl HA-CTA by removal of trimethylsilyl groups therefrom. Optionally, crosslinking may be performed during the shaping/molding of the HA esters into a structure/device, or thereafter, if at all. Native HA can then be regenerated/recovered by saponification hydrolysis, removing acyl groups, —CH$_3$(CH$_2$)$_{10}$CO, and the cetyltrimethyl ammonium salt groups, -CTA, from HA ester. The structure/device of a preselected shape (e.g., porous or solid, bulk structure or fibers) may become a component of an assembly, a product that is further processed, integrated into another component (e.g., laminated, adhered, assembled, further shaped, chemically-intermixed/intermingled), and so on.

8 Claims, 4 Drawing Sheets

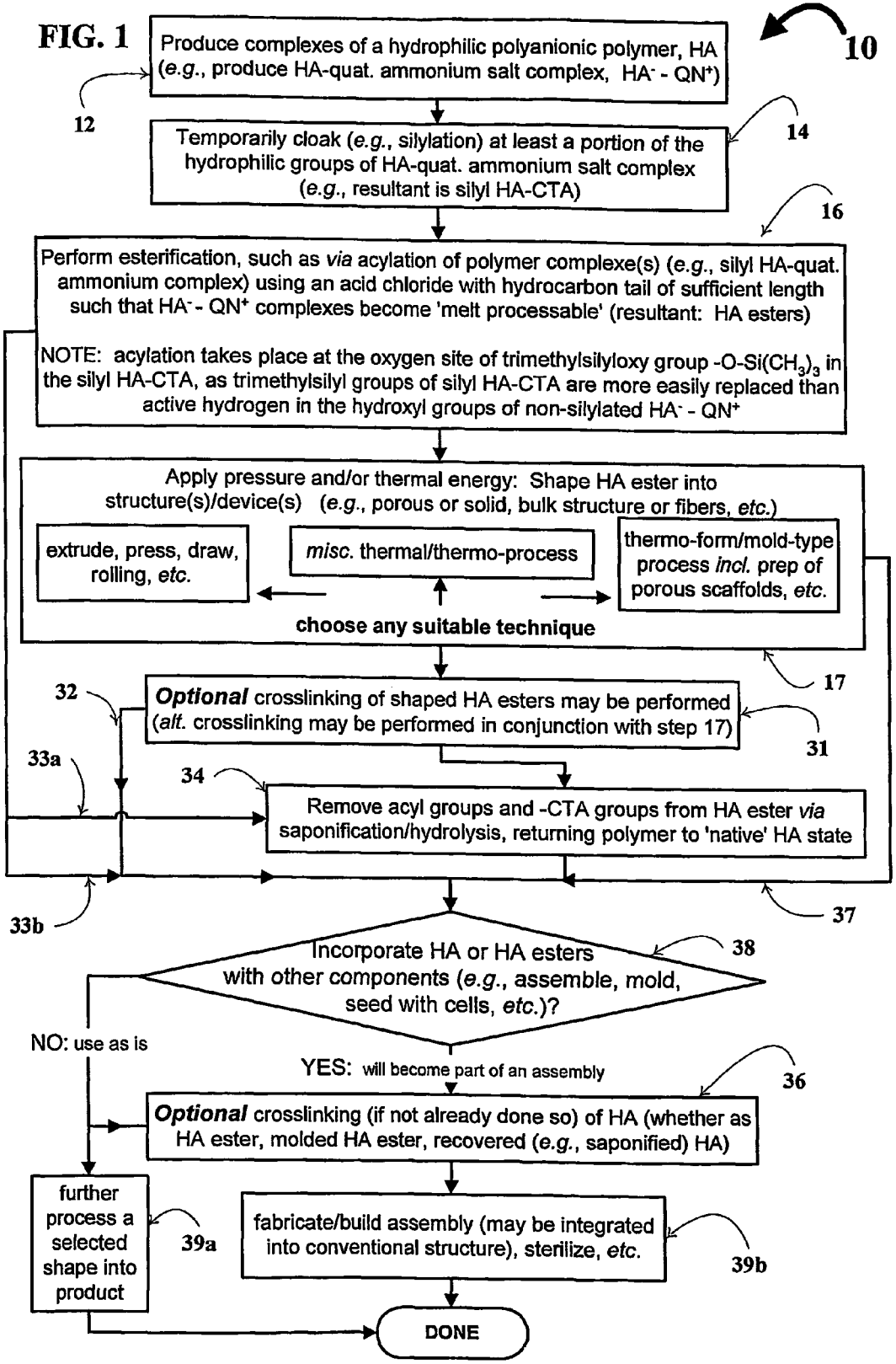

Hyaluronic Acid (Hyaluronan)

where $R = H$, structure represents plain $HA^--QN^+$ complex
where $R = Si(CH_3)_3$, structure represents silylated $HA^--QN^+$ An acylated silylated $HA^--QN^+$ complex structure, such that $Si(CH_3)_3$ groups now replaced with $R'CO$

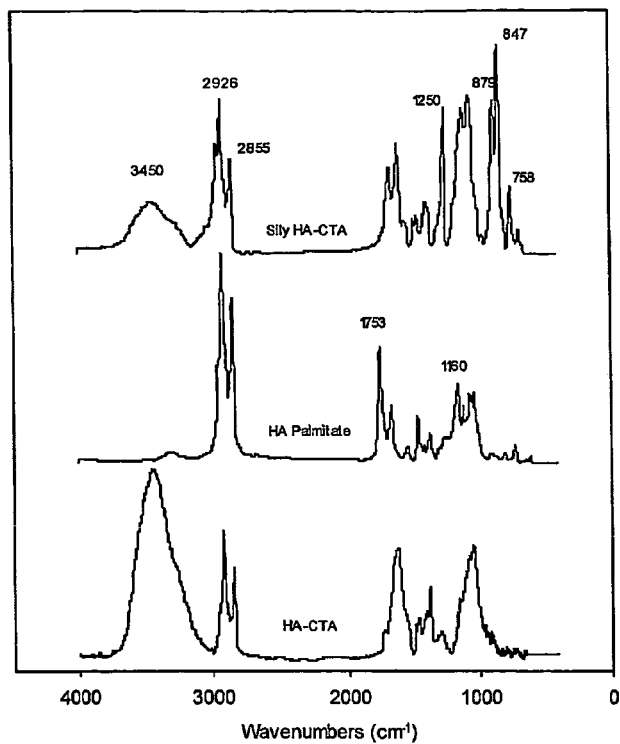
FIG. 3
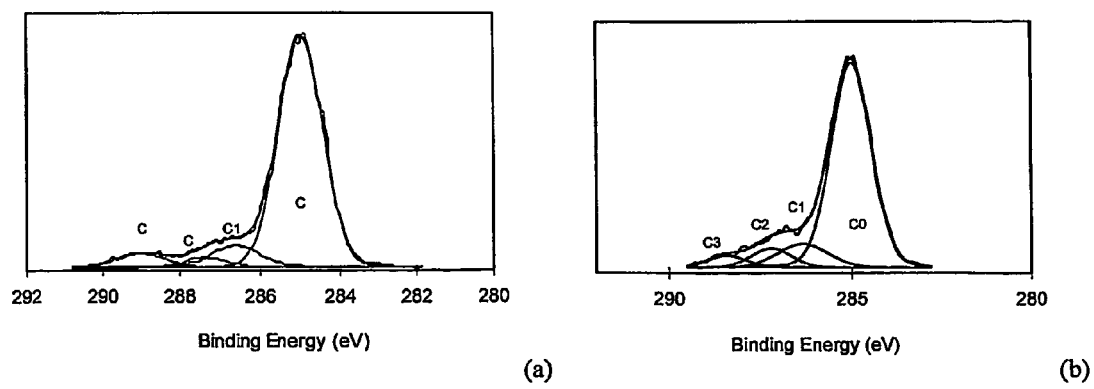
FIG. 4A
FIG. 4B

HYALURONAN (HA) ESTERIFICATION VIA ACYLATION TECHNIQUE FOR MOLDABLE DEVICES

BACKGROUND OF THE INVENTION

In general, the present invention relates to the synthesis and use of hyaluronan (a.k.a., hyaluronic acid, sodium hyaluronate, or HA), and other hydrophilic polymers with pendant hydroxy groups that are not generally melt-processable in their 'native' state. As a naturally occurring polysaccharide with a large unbranched structure consisting of repeating disaccharides of N-acetylglucosamine and glucuronic acid, the structure of shown in FIG. 2A, present in vertebrate tissues and body fluids, HA has certain physical and biological properties, including viscoelasticity, hydrophilicity, lubricity and cell-activity regulation. Native HA and its currently available derivatives degrade before melting; thus, they cannot be thermally molded into custom shapes or otherwise thermally integrated with thermoplastic biomaterials. In biomechanical applications where characteristics such as maintaining a shape and/or supporting or protecting/cushioning a structure (e.g., joints, bone, cartilage and other tissue) are important, as well as for surgery instruments and aids, etc. and other mechanisms (whether biocompatibility is an issue)—degradation prior to melt point is an obstacle to using HA. The extreme hydrophilicity of HA does not permit use in conjunction with durable, hydrophobic biomaterials, such as polyethylene or polypropylene. Furthermore, the quick turnover within an animal body limits use of native HA in applications such as longer-term and permanent implants.

More-specifically, the instant invention is directed to a novel melt- or mold-processable hydrophilic polyanionic polymer with pendant hydroxy groups that are not generally melt processable in their native state, such as HA, as well as a method of synthesis of such a polymer. Of particular interest is hyaluronan/hyaluronic acid/sodium hyaluronate (generally, throughout referred to as "HA"); produced according to the invention, the melt- or mold-processable HA has a melting point below the point at which the polymer degrades. Pure (whether synthetic or genetically engineered, or native) HA has a melting point above the point of substantial degradation making it by-and-large impossible to mold or shape into structures suitable for use. A polymeric material produced according to the unique technique of the invention, provides a processable HA polymer that, once re-hardened (i.e., cooled or otherwise solidified), can be used in a variety of product applications, whether resultant structures are used 'as is' having been molded, extruded, or otherwise shaped into a mechanism/piece/device/etc. or employed as a member, component or subassembly of an assembly/system.

According to the invention a series of novel, melt- or mold-processable HA esters with varying aliphatic chain lengths are synthesized from silyl HA-quat. ammonium salt complex (preferably silyl HA-CTA, a silylated HA complex with cetyltrimethyl ammonium salt, a hyaluronan derivative). Introduction of aliphatic acyl groups (e.g., acid chlorides listed, TABLE 1) to HA disrupts the strong HA intermolecular bonding, reducing the crystallinity and producing appreciable thermoplasticization. Acylation takes place at the oxygen of the trimethylsilyloxy group —O—$Si(CH_3)_3$ in the silyl HA-CTA by removal of trimethylsilyl groups therefrom. Optionally, crosslinking may be performed during the shaping/molding of the HA esters into a structure/device, or thereafter, if at all. Native HA can then be regenerated/recovered by saponification/hydrolysis, removing acyl and -CTA groups. The structure/device of a preselected shape (e.g., porous or solid, bulk structure or fibers, etc.) may become a component of an assembly, a product that is further processed (e.g., seeded with cells, further shaped, etc.), integrated into another component (e.g., laminated, adhered, assembled, further shaped/molded together with a component, chemically-intermixed/intermingled, etc.), and so on.

Structure(s) produced according to the invention may be composed entirely of the melt- or mold-processable derivatized HA (or other polymer with hydroxy groups) and used alone, or used as scaffold for biological materials (e.g., cells, morphogenic proteins) or incorporated into a component, piece, module, feature, or mechanism/structure/member to produce a 'system' such that the HA's hydrophilic outer surface provided is interior- or exterior-facing, etc. A non-exhaustive list of possibilities contemplated for use of the derivative HA of the invention—including those where a generally hydrophilic outer surface is desirable—include: bearing surfaces or components for items such as gears, fishing rod eyelets, bearings of all types, joint and other weight-bearing mechanisms, whether incorporated as part of manufacturing equipment, as part of the manufactured product itself, etc.; flexible barrier surfaces separating a first and second area (such flexible barriers to include the membrane material or tubing used for catheter balloons, catheter tubing, hot air balloons, condoms, IV tubing, diaphragms, flexible bladders, etc.); transparent member surfaces including the transparent planar or curved polymeric films and sheet material used where optical clarity is sought, such as for fish tanks, polymeric covers for vehicle, water- or aircraft head-lamps and blinkers/fog-lights, covers for spot-lights, windows on or in a vehicle, aircraft, watercraft, and spacecraft, monitor and television screens, ophthalmic lenses, camera lenses and view-finders, etc.; in vivo implants of any of a variety of total or partial joint replacements, splints, stents, diaphragms, etc.; drag reduction surfaces and associated components of a vehicle, watercraft, aircraft and spacecraft such as hulls, pontoons, vehicle-body parts, blades/runners, etc., as well as the glide-surface of snowboards, water and snow skis, etc.; reaction resins for research or industrial components; topical dressing surfaces for dressings such as those used for medical/veterinary applications such as adhesive bandages, sterile pads for wounds and surgical procedures, bandage tape/adhesive, ace bandages, soft casts, etc.; and dental splints (to include mouth-guards, tooth/jaw-correction splints, etc.).

Further examples of applications for the invention include: tissue engineered scaffolds (porous, seeded with cells, etc.) for cartilage and other tissue repair and treatment, wound dressings, artificial skin, viscoelastics for intra-surgical protection and prevention of post-operative adhesions, hydrophilic, lubricious and/or anti-fouling and/or anti-coagulant coatings (e.g., catheters, contact lenses, dialysis membranes), drug release/delivery devices, and biodegradeable materials (e.g., nerve guides).

While the focus, here, is of HA (i.e., a hydrophilic polyanionic polymer with hydroxy groups that is not generally melt processable in currently available native or derivative state(s)) other biomaterials exhibiting similar characteristics that would benefit from molding or shaping are contemplated hereby as a starting polymer. Examples shown herein showcase the synthesis of unique HA esters, i.e., melt- or mold-processable HA derivatives having hydrophobicity and compatibility with other generally hydrophobic materials. Derivatization of HA according to the invention permits control of its hydrophobicity, expanding the range of useful solvents and non-solvents during synthesis and fabrication into end product. In the spirit and scope of design goals contemplated hereby, the novel melt- or mold-processed polymer produced according to the invention may be made by chemically modifying a wide variety of hydrophilic polyanionic polymers containing pendant hydroxy groups, including without limitation: polyanionic polyhydroxy polymers such as polysaccharides and glycoaminoglycans.

Hyaluronan was first isolated from bovine vitreous humor in acid form in 1934; it was coined "hyaluronic acid" meaning uronic acid from hyaloid (vitreous). The first non-inflammatory fraction of sodium hyaluronate, called NIF—NaHA, which was free of impurities that could cause inflammatory reactions was synthesized by Endre Balazs. HA has certain physical and biological properties: (1) Viscoelasticity. Hyaluronan carries one carboxyl group (—COOH) per disaccharide unit, which is dissociated at physiological pH thereby conferring a polyanionic characteristic to the compound; (2) Hydrophilicity. Hyaluronan acts as a water-retaining polymer network in many tissues; it can hold large amounts of water like a molecular sponge. The hydrodynamic volume of HA in solution is 1000 times larger than the space occupied by the unhydrated polysaccharide chain. (3) Lubricity. The extraordinary viscoelastic properties also make hyaluronan ideal as a lubricant. Hyaluronan in synovial fluid complexes with proteins and penetrates the surface of cartilage, forming a layer of HA protein complex that serves as a lubricating layer in joints and other tissue surfaces that slide along each other. Under slow mechanical loading it behaves as a viscous oil-like lubricant. At higher mechanical loading rates the HA layer becomes a highly deformable elastic system: it absorbs and converts an imposed stress into an elastic deformation, then rebounds to the original condition when the stress is removed.

Not only does HA act as a vital structural component of connective tissues, it also plays an role in diverse biological processes, such as cellular migration, mitosis, inflammation, cancer, angiogenesis and fertilization. However, HA's high solubility, rapid degradation and short residence time in water have historically limited biomedical application of naturally occurring HA, particularly in tissue engineering and viscoseparation applications. Four pendant groups on hyaluronan are available (FIG. 2A) for chemical modification: carboxyl, hydroxyl, acetamido group and the reducing end-group. Prior attempts of others at synthesizing HA derivatives have been directed at modifying one or more of these groups, resulting in much different derivative end-product (none have thermoplastic characteristics, as they by-and-large have no meltable endotherms).

Two groups of commercialized hyaluronan derivatives, include HYLAN and HYAFF®: HYLAN is a brand name for a crosslinked hyaluronan in which crosslinking only occurs on hydroxyl groups, not affecting carboxyl and acetamide groups, this cross-linking was done by Balazs and his colleagues. HYAFF® is the brand name of a class of hyaluronan esters with the free carboxyl group of glucuronic acid esterified using different types of alcohols (delta Valle et al., U.S. Pat. No. 4,851,521, 1989). patent application No. US 2002/0143171 A1 published 3 Oct. 2002 to Yui et al. focuses on a chemically modified HA for use as pharmaceuticals, foodstuffs, cosmetics (e.g., moisturizing agent, lotion) and similar flowable, gel-like substances, but their crosslinked polymer can not melt without first degrading. Yui et al. modified the hydroxyl groups of HA with an acid halide carrying photoreactive groups, such as cinnamoyl chloride, in DMF solution in the presence of pyridine. The product was dissolved in DMF, and was subjected to ultraviolet radiation to crosslink HA. The applicants hereof have published earlier work: US App. US 2003/0083433 A1 filed on behalf of the assignee hereof for the applicants on 29 Oct. 2002, and is hereby incorporated herein by reference to serve as technical background support.

'Animal' as used throughout includes any multicellular organism having a body that can move voluntarily and actively acquire food and digest it internally, including human beings and other mammals, birds and fish. 'Extrude'/'extrusion' as used includes a molding technique as follows: the moldable material is forced through the shaping die of an extruder; may have a solid or hollow cross section. The following general acronyms, if used throughout, are decoded on the following page:

HA—Hyaluronic acid/hyaluronan/sodium hyaluronate.
HA-CPC—the complex of HA polyanion and cetylpyridinium salt.
HA-CTA—the complex of HA polyanion and cetyltrimethyl ammonium salt.
$HA^-$-$QN^+$—the complex of HA polyanion & long-chain paraffin ammonium cation.
HMDS—hexamethyldisilazane, a silylation agent.
THF—Tetrahydrofuran.
TMCS—trimethylchlorosilane, a silylation agent.
$QN^+$—long-chain paraffin ammonium cation.

SUMMARY OF THE INVENTION

It is a primary object of the invention to provide a process for producing a hyaluronan (HA) ester having mold- or melt-processable characteristics. The HA ester is synthesized by (a) performing a silylation reaction on an HA-quaternary ammonium complex and (b) performing an acylation reaction on the silyl HA-quaternary ammonium complex using an acid chloride. Also disclosed as featured herein, are the associated unique HA ester and shape-structures made out of the unique HA ester and out of regenerated HA, as well as the HA ester as further processed and/or integrated into an assembly or system. While HA is the focus, also contemplated within the spirit and scope are other hydrophilic polyanionic polymers containing pendant hydroxy groups are contemplated as starting material—including without limitation, polyanionic polyhydroxy polymers such as polysaccharides and glycoaminoglycans.

There are numerous further distinguishing features of the process and resulting HA ester. The step of performing a silylation reaction preferably includes silyating an HA-cetyltrimethyl ammonium salt complex, HA-CTA, which produces a silyl HA-cetyltrimethyl ammonium salt complex. The step of performing an acylation reaction preferably includes introducing an acid chloride such as one of the following aliphatic acyl groups: Hexanoyl, $CH_3(CH_2)_4COCl$; Octanoyl, $CH_3(CH_2)_6COCl$; Decanoyl, $CH_3(CH_2)_8COCl$; Lauroyl, $CH_3(CH_2)_{10}COCl$; Palmitoyl, $CH_3(CH_2)_{14}COCl$; and Stearoyl, $CH_3(CH_2)_{16}COCl$. The hyaluronan (HA) ester can be shaped by applying thermal energy to melt-process the ester into a structure-shape, or by applying pressure to shape the HA ester. A wide variety of structure-shapes are contemplated, including without limitation: polymer fibers, generally solid bulk or porous bulk structure—the bulk structure shape can be that of a thin layer or other generally planar shape, an irregular shape such as that for an implant or tissue, a classic regular shape such as cylindrical, torus, block, and so on. The porous structure can be 'seeded' with cells.

A saponification substantially removing acyl groups, —$CH_3(CH_2)_NCO$, and the cetyltrimethyl ammonium salt groups, -CTA, from the HA ester to produce a regenerated HA, can be performed after an initial shaping the ester (e.g., box 17 to box 34, FIG. 1), or prior to shaping into a preselected structure-shape (e.g., from box 16 via route 33a to box 34). The step of shaping the HA ester into a structure-shape can be done in conjunction with a crosslinking of the HA ester.

In another aspect, a hyaluronan (HA) ester is produced from an acylated silyl HA-cetyltrimethyl ammonium salt complex, wherein an acylation agent is used in producing the complex and comprises an acid chloride selected from the group consisting of: Hexanoyl, $CH_3(CH_2)_4COCl$; Octanoyl, $CH_3(CH_2)_6COCl$; Decanoyl, $CH_3(CH_2)_8COCl$; Lauroyl, $CH_3(CH_2)_{10}COCl$; Palmitoyl, $CH_3(CH_2)_{14}COCl$; and Stearoyl, $CH_3(CH_2)_{16}COCl$. Once again, the HA ester can be shaped into a structure-shape that is saponified into a regenerated HA form, and the structure-shape integrated with a component. The HA ester preferably having been produced from an acylated silyl HA-cetyltrimethyl ammonium salt complex.

As can and will be appreciated, certain of the many unique features, as well as the further-unique combinations thereof, supported and contemplated hereby within the spirit and scope of this disclosure, may provide a variety of advantages. The advantages of the new features and combinations disclosed hereby will be appreciated, especially by providers of medical and veterinary care and services and products (where biocompatibility with animal tissue and functionality is a consideration), by perusing the instant technical discussion, including drawings, claims, and abstract, in light of drawbacks to traditional devices and known materials identified throughout, or as may be uncovered.

The unique melt-processable HA material and process for producing, provide design options and versatility to accommodate a wide variety of applications. The basic novel structure and characteristics of the melt-processable HA material of the invention makes it adaptable for use in fabricating a wide variety of configurations/shapes (porous or solid, bulk structure or fibers, etc.) and sizes, with or without crosslinking with other material(s). The unique approach taken for producing the melt-processable HA material is reproducible and can be carried out without the need to employ reaction catalysts.

BRIEF DESCRTIPTION OF THE DRAWINGS

For purposes of illustrating the innovative nature plus the flexibility of design and versatility of preferred and alternative mold- and melt-processable. HA material and associated method of producing, supported and disclosed hereby, the invention will be better appreciated by reviewing accompanying drawings (in which like numerals, if used, designate like or similar parts). One will appreciate the features that distinguish the instant invention from conventional structures and applications. The drawings have been included to communicate features of the innovative core and further unique process of producing and associated structure, the HA material of the invention, as well as to demonstrate the unique approach taken, by way of example only, and are in no way intended to unduly limit the disclosure hereof.

FIG. 1 is a flow diagram depicting details of a process 10 of producing the polymeric HA derivative material and structure(s) according to the invention—illustrated are core, as well as further distinguishing features, resulting in chemical structures such as those represented, by way of example only, in FIGS. 2A-2C.

Figure 2A:
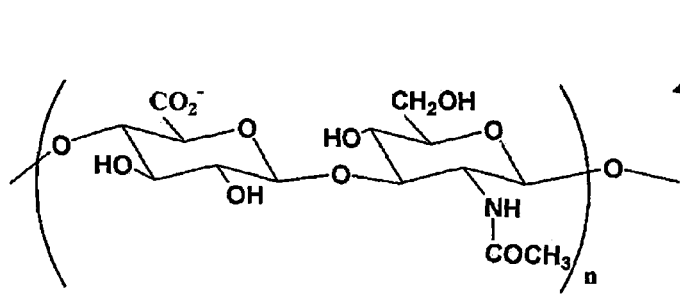
FIG. 2A depicts a chemical structure of 'native' hyaluronan (HA).
Figure 2B:
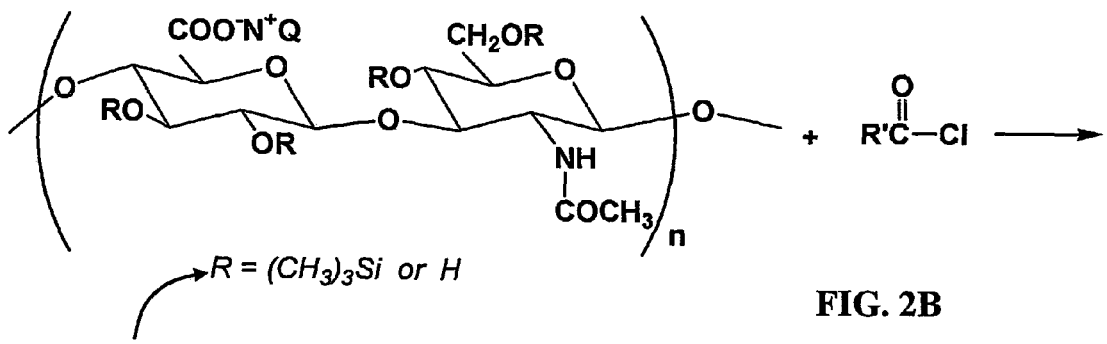
Figure 2C:
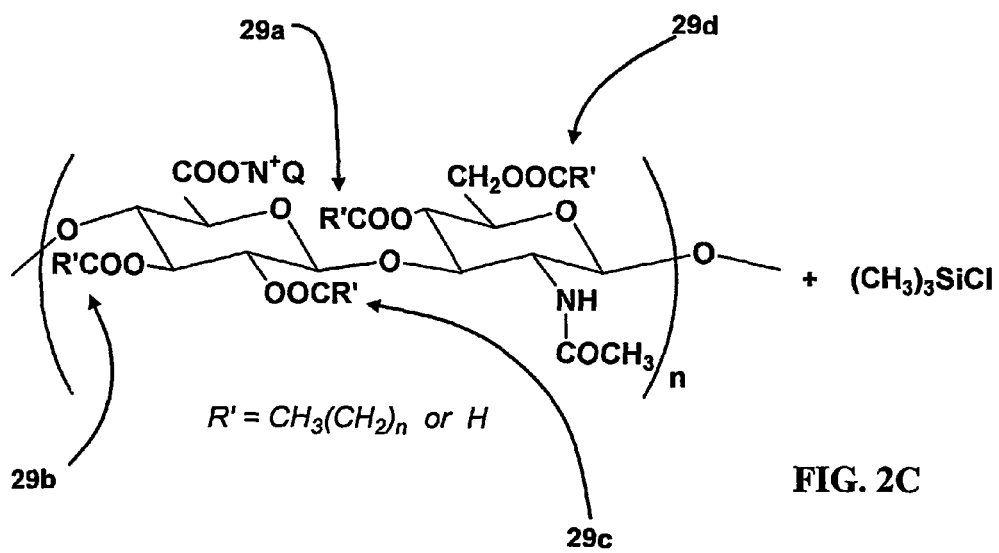

FIGS. 2B-2C depict the synthesis of HA esters according to the invention wherein an acid chloride is used as acylation agent: FIG. 2B depicts alternative structures of HA with R=H as the $HA^--QN^+$ complex, and as a silylated $HA^--QN^+$ complex structure in which $R=Si(CH_3)_3$; and FIG. 2C depicts the structure of an acylated silylated $HA^--QN^+$ complex wherein $Si(CH_3)_3$ groups are replaced by R'CO, with $R'=CH_3(CH_2)_n$.

FIG. 3 is a graphical representation of Fourier Transform Infrared Spectroscopy (FT-IR) spectra of silyl HA-CTA, HA palmitate and HA-CTA.

FIG. 4A-4B are graphical representations of high-resolution XPS C1s spectra of binding energy as labeled: FIG. 4A is of HA laurate; FIG. 4B is of silyl HA-CTA.

Figure 5A:
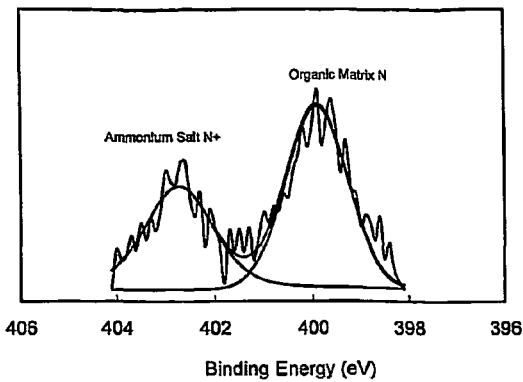
Figure 5B:
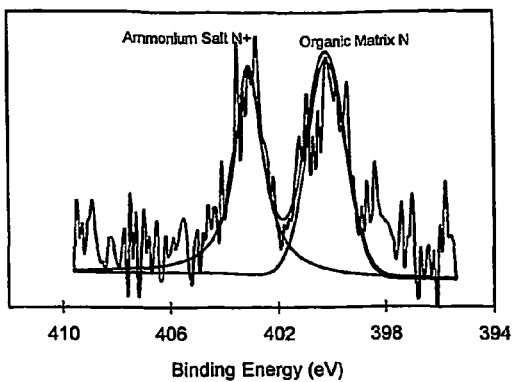

FIG. 5A-5B are graphical representations of high-resolution XPS N1s spectra of binding energy as labeled: FIG. 5A is of HA laurate; FIG. 5B is of silyl HA-CTA.

Figure 6:
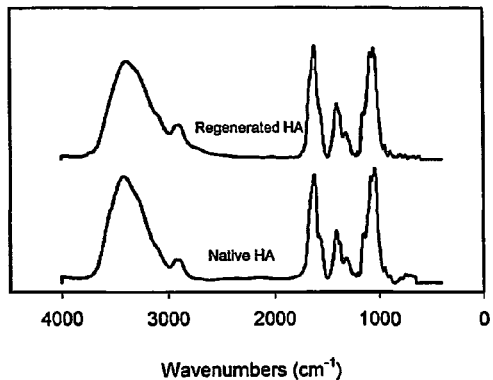

FIG. 6 is a graphical representation of FT-IR spectra of regenerated HA from saponification (top curve as labeled) and 'native' HA (bottom curve as labeled).

Figure 7:
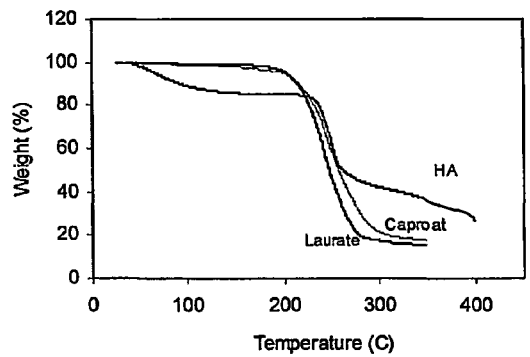

FIG. 7 is a graphical representation of Thermal Gravimetric Analysis (TGA) done for HA, HA caproate, and HA laurate (curves as labeled).

Figure 8:
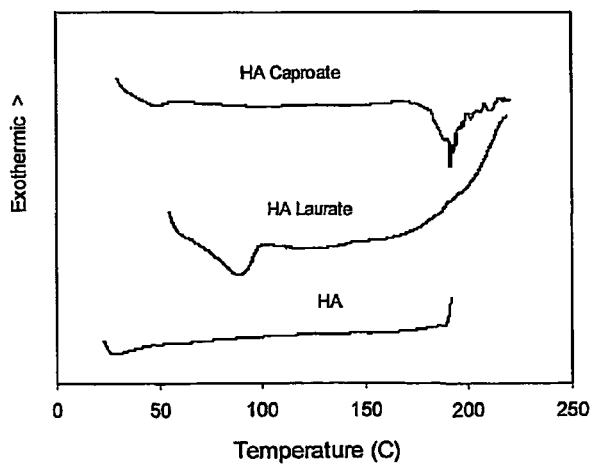

FIG. 8 is a graphical representation of Differential Scanning Calorimetry (DSC) done for HA, HA caproate, and HA laurate (curves as labeled).

DETAILED DESCRIPTION OF EMBODIMENTS IN DRAWINGS

Reference will be made back-and-forth to the several figures in connection with discussion of the examples as well as the features of the invention: FIG. 1 details features of a method 10 for producing HA esters, regenerated HA, and structure-shapes of the invention in a flow-diagram format, to better appreciate the features of the HA structures depicted in FIGS. 2A-2C.

The FIG. 1 flow diagram depicts details of a process 10 of producing the mold- and melt-processable material and structure(s) according to the invention—illustrated are core, as well as further distinguishing features, resulting in chemical structures such as those represented, by way of example, in FIGS. 2A-2C. FIG. 2A depicts a chemical structure of 'native'—or, sometimes referred to as plain—hyaluronan (HA). FIGS. 2B-2C depict the synthesis of HA esters according to the invention wherein an acid chloride is used as acylation agent. FIG. 2B depicts alternative structures of the hydrophilic polyanionic polymer HA, as shown in FIG. 2B with R=H as an $HA^-QN^+$ complex (step 12, FIG. 1), and as a silylated $HA^--QN^+$ complex structure in which $R=Si(CH_3)_3$ (step 14, FIG. 1). FIG. 2C depicts the structure of an acylated silylated $HA^--QN^+$ complex wherein $Si(CH_3)_3$ groups are replaced by R'CO, with $R'=CH_3(CH_2)_n$ (box 16, FIG. 1). As mentioned, and as further described in detail by way of example, the $HA^--QN^+$ complex can be an HA-cetyltrimethyl ammonium salt complex, HA-CTA, whereby silylating produces a silyl HA-CTA complex.

As represented by FIG. 2C, the silylated complex of FIG. 2B has been acylated according to the invention to produce the mold- or melt-processable polymer (HA ester) after having performed step 16, FIG. 1. As one can appreciate (FIG. 2B), the cloaking of $HA^--QN^+$ complexes results in the hydrophilic groups being replace with silylated functional groups: hydrogen (H) has been replace with $Si(CH_3)_3$; and once an acylation of the FIG. 2B polymer complexes using an acid chloride (preferably one having a hydrocarbon tail of sufficient length such that the complexes have an opportunity to become mold- or melt-processable) has been performed (step 16, FIG. 1), an HA ester complex such as that depicted in FIG. 2C results. The example represented by FIG. 2B is a silylated HA⁻-QN⁺ complex that has been acylated wherein the Si(CH$_3$)$_3$ groups are replaced by R'CO, with R'=CH$_3$ (CH$_2$)$_n$.

Returning to FIG. 1, a method 10 of producing structure(s)/devices/product according to the invention is illustrated—as mentioned, included are core, as well as further distinguishing, features of the invention. Steps of the method include: Produce complexes of a hydrophilic polymer such as HA (box/step 12). Temporarily cloak (e.g., preferably via silylation) at least a portion of the hydrophilic groups of the HA-quat. ammonium salt complex. Perform esterification employing a suitable process such as acylation of the polymer complexes using an acid chloride (box 16). As noted in FIG. 1 (box 16) acylation takes place at the oxygen site of the trimethylsilyloxy group —O—Si(CH$_3$)$_3$ in the silyl HA-CTA, as trimethylsilyl groups of silyl HA-CTA are more easily replaced than active hydrogen in the hydroxyl (—OH) groups of non-silylated HA⁻-QN⁺ (i.e., the location of the Si(CH$_3$)$_3$ groups is where the acid chloride 'attacks' the FIG. 2B silylated HA-CTA complex(es)).

A desired shape can then be attained by pressure and/or thermal/thermo-processing employing any of a number of suitable process whereby the lower melt temperature may be attained and pressure sufficient to produce the end-structure(s)/device(s)/piece(s) (box/step 17). A wide variety of structure-shapes are contemplated, as explained here-throughout, which may be attained by employing a wide variety of well known molding/shaping processes. As in FIG. 1, optionally, a crosslinking of resultant polymeric structures may be performed at different points within process 10: steps 31 and 36. Next, removal of acyl groups and -CTA groups from the polymer complexes in solution may be done; e.g., dissolving the HA ester in an organic solvent blend (e.g., NaCl for hydrolysis—the organic solvent is selected based on HA ester structure) and using an aqueous alkaline solution to saponify, as collectively identified as step 34. Thus producing a generally hydrophilic outer surface on a structure-shape made out of the HA ester.

Flexibility of use of the novel HA ester synthesized according to the invention can be appreciated (see FIG. 1). Further processing into selected product structure-shape may be done as shown, by way of example, in FIG. 1: The HA ester may be shaped (step 17) and crosslinked (step 31) then further processed (pathway 32 to option 38); saponification/hydrolysis may be performed on the HA ester (pathway 33a to step 34); or HA ester may simply be used/further processed (33a to option 38) prior to being returned to a regenerated HA structure. The thermally formed structure(s)/piece(s)/etc. may be used 'as is' and further processed as necessary (box 39a) or further processed and built into an assembly/system (e.g., may be integrated into a conventional structure), sterilized, and so on (box 39b)—depending upon final application of the end-product. For example, regenerated HA may be hot-molded with thermoplastic ultra high molecular weight polyethylene for joint replacements implants, or the HA esters can be molded into animal tissue scaffold.

As mentioned, the applicants hereof have published earlier work: US Patent App. US 2003/0083433 A1 filed on behalf of the assignee hereof for the applicants. In this earlier work, applicants provide background as to silylation of HA complexes.

Begin Quoted Text:

Example 2

By way of further examples the following is offered: In the case of using a guest of HA, which is strongly hydrophilic with its many polar groups (—COOH, —OH and —CONHCH$_3$) on its long molecular chain, diffusion of HA molecules directly into a bulk UHMWPE structure is difficult. Therefore a modification of the HA molecules is done to increase hydrophobicity and compatibility with both UHMWPE and organic solvents used in connection with cloaking.

2A) Silylation of HA to increase its hydrophobicity: Silylation is a known technique for increasing hydrophobicity, and createorganic-soluble derivatives of substances. During a silylation reaction of HA, the hydrophilic groups containing active hydrogen, such as —COOH, —OH, and —NH$_2$, are masked by hydrophilic silyl groups. The reaction is reversible, the silylated functional groups can be returned to their original state through hydrolysis reaction. HA is a muco-polysaccharide of molecular weight up to millions (~10$^6$). Compared with silylation of poly-L-lysine (MW=~1000), silylating HA is difficult due to its large molecular weight. In contrast to PLL silylation previously performed by the applicants (see above), preferably HA is modified before silylation to increase its solubility in silylation solvents (polar organic solvents can be used). The steps include:

(1) Reaction of HA with long-chain aliphatic quaternary ammonium salts (QN⁺). Polyanions, such as HA, combined with certain organic cations, such as paraffin chain ammonium (QN⁺) ions, produces a precipitable complex. The complex is a true salt of the polyacid and quaternary base. HA was modified with long-chain aliphatic ammonium salts, to improve its solubility in organic solvents. Combination of QN+ with polyannions occurs in those pH ranges in which the polyannions are negatively charged. The reaction between HA and ammonium cations in water can be expressed:

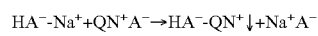

where HA⁻-Na⁺ is the sodium salt of hyaluronic acid; HA⁻-QN⁺ is the precipitable complex between HA carboxylic polyanion and long chain paraffin ammonium cations. HA⁻-QN⁺(HA-CPC/HA-CTAB) complexes were used. The complexes (HA⁻-QN⁺) precipitated from HA aqueous solution are soluble in concentrated salt solutions, so HA can be recovered from its insoluble complexes. Ammonium salts used were: cetyltrimethylammonium bromide monohydrate (MW: 358.01) (CTAB) and cetylpyridinum chloride (M.W. 364.46) (CPC).

(2) Silylation of HA⁻-QN⁺ complexes: HA-CPC and HA-CTAB were silylated in DMSO solution with BSA, HMDS and other typical silylation agents. Silylation agents are generally sensitive to humidity, silylating operation should be under the purge of dry N$_2$.

2B) Acylation of HA to improve its thermal flow: To make HA flowable at high temperature, the strong hydrogen bonding between its molecules must be disrupted, and the molecular order (i.e., crystallinity) of HA needs to be destroyed. Acylating the hydroxyl groups on HA with long-chain aliphatic carboxylic acids chloride will help in de-crystallizing HA. Acid chlorides, from caproyl to stearoyl chloride, can be used as acylating agents. Acylation is a known process for disrupting crystallinity in other polysaccharides. Acylation reactions are performed in solution (of HA⁻-QN⁺ in DMSO, for example). Start with a DMSO solution of HA⁻-QN⁺ complex using the technique described above in connection with Silylation of HA, above. Acylation is done to make the hydrophilic guest hydrophobic enough to be molded with a hydrophobic host, such as UHMWPE, without phase separation.

2C) Entanglement by Swelling of Host to Facilitate Diffusion of Guest: . . .

2D) Entanglement by using Porous (eg. UHMWPE) Host Structure: . . .

2E) Entanglement by Powdered Mixture which can be Molded: . . .

End Quoted Text.

Once again, in connection with reviewing the example(s) depicted throughout, one will appreciate that a variety of alternative acid chlorides are suitable for use as identified in the results reported in TABLE 1. Results of the solubility of HA esters as investigated, are identified for reference, in TABLE 2.

TABLE 1

Properties of HA and its aliphatic esters

| Material | Acid Chlorides | Formula of Acid Chlorides | Melting Point (° C.) | Starting Point of Degradation (° C.) |
|---|---|---|---|---|
| HA | | | No* | 212 |
| HA-CTA | | | No* | 175 |
| Silyl HA-CTA | | | No* | 161 |
| HA Caproate | Hexanoyl | $CH_3(CH_2)_4COCl$ | 191.7 | 170 |
| HA Caprylate | Octanoyl | $CH_3(CH_2)_6COCl$ | 188.9 | 184 |
| HA Caprinate | Decanoyl | $CH_3(CH_2)_8COCl$ | 156.7 | 187 |
| HA Laurate | Lauroyl | $CH_3(CH_2)_{10}COCl$ | 97.8 | 191 |
| HA Palmitate | Palmitoyl | $CH_3(CH_2)_{14}COCl$ | 96.4 | 200 |
| HA Stearate | Stearoyl | $CH_3(CH_2)_{16}COCl$ | 88.3 | 194 |

*No melting temperature: polymer degrades before melting.

TABLE 2

Solubility of HA esters in organic solvents

| HA Esters | DMSO | THF | Acetone | Xylenes | Hexane |
|---|---|---|---|---|---|
| HA Caproate | swollen | + | + | + | − |
| HA Caprylate | swollen | + | + | + | − |
| HA Caprinate | swollen | + | + | + | − |
| HA Laurate | − | + | + | + | − |
| HA Palmitate | − | − | − | + | + |
| HA Stearate | − | − | − | + | + |

"+" soluble;
"−" insoluble.

1.0 EXAMPLE

A series of melt-processable hyaluronan (HA) esters were synthesized. A silylated complex of HA with cetyltrimethylammonium cations (silyl HA-CTA) was used as the starting material. Reactions were performed with acid chlorides as the acylation agents in both xylenes or no solvent other than the acid chloride. The disappearance of all characteristic FT-IR vibration bands associated with the —OSi(CH₃)₃ groups and the appearance of the strong ester carbonyl peak at 1753 cm⁻¹ demonstrated success of esterification (step 16, FIG. 1). Thermoplasticity was achieved when length of aliphatic chains in the HA ester was equal to or greater than 10 carbon atoms: The longer the ester chain, the lower the melting point (TABLE 1). As uniquely identified herein, to meet targeted specifications—different melting temperatures—an adjustment can be made to the acid chloride chain length.

It is known that long paraffin-chain quaternary ammonium compounds, including cetyltrimethylammonium bromide (CTAB) and cetylpyridinium chloride (CPC), can be used to precipitate polyanions of hyaluronan and various sulfuric polysaccharides from aqueous solution as polysaccharide-ammonium salt complexes. These prior complexes were actually salts between polysaccharide acids and quaternary ammonium bases, which were soluble in salt solutions, such as sodium chloride of varying concentrations. For example, HA-CP complex is soluble at sodium concentrations above 0.2 N, while the complexes with sulfated polysaccharides (such as keratosulfate, chondroitin sulfate, heparin and so on) usually require higher salt concentrations for solubility. Here, to synthesize HA esters from HA-aliphatic quaternary ammonium salt complexes: The dissociated carboxyl group on hyaluronan (HA) is combined with aliphatic quaternary ammonium cations for separation from other polysaccharides and as an intermediate for further modification according to the invention.

1.1 Materials. Silyl HA-CTA was obtained using sodium hyaluronate (HyluMed®, medical grade, MW: 1.36×10⁶ daltons) from Genzyme (Cambridge, Mass.). Acid chlorides, including hexanoyl (caproyl), octanoyl (capryloyl), decanoyl (caprinoyl), lauroyl, palmitoyl, and stearoyl chlorides (TABLE 1), are available from Aldrich (Milwaukee, Wis.). Xylenes, hexane, acetone, dimethylsulfoxide (DMSO), tetrahydrofuran (THF), pyridine, and potassium hydroxide are available from Fisher (Pittsburgh, Pa.). Ethanol (ACSIUSP grade) is available from Pharmco (CT).

1.2 Synthesis of HA esters. Silyl HA-CTA, 200 mg, was added to 5-10 equivalents of acid chlorides under N₂ atmosphere. The mixture was heated for 0.5-1 h at 80° C. Once cooled, the reaction product solution became a turbid, viscous paste or, in the case of HA stearate, a solid. Hexane was used to precipitate the HA caproate, caprylate, caprinate and laurate from the product mixtures. Acetone was used to wash the excess of palmitoyl and stearoyl chlorides from the HA esters. After precipitating or washing, the resulting HA esters were dried in a vacuum oven until constant weight was obtained. When performing synthesis with solvents, xylenes were used to form a homogeneous solution and promote reaction. After esterification, xylenes were removed as well as excess acid chlorides were also removed.

1.3 Saponification of HA esters. For those esters soluble in acetone, such as HA caproate, caprylate, caprinate and laurate, 200 mg of HA ester were dissolved in 20 ml of acetone-ethanol mixture solvent (v/v 1:1), forming a clear solution. Aqueous 1M KOH solution (5 ml) was slowly added to the solution. The saponified HA ester gradually precipitated from solution. After addition of 5 ml water, the solution stood at room temperature for another hour to saponify the ester residue. The precipitate was filtered and the KOH was removed by dissolving the precipitate in water and re-precipitating with ethanol. The final white particle product, regenerated HA, was vacuumed dried until a constant weight was obtained. For those HA esters insoluble in acetone, such as HA palmitate and stearate, 200 mg of ester was dissolved in a pyridine-ethanol mixture solvent.

1.4 Fourier Transform Infrared Spectroscopy (FT-IR). A Nicolet Magna-IR 760 Spectrometer (E.S.P.) was used to record FT-IR spectra. Transmission absorption spectra were collected over a range 600-4000 cm$^{-1}$ at a resolution of 4 cm$^{-1}$ with 128 scans. HA caproate, caprylate, caprinate and laurate were dissolved in acetone and coated on NaCl disks for FT-IR analysis. HA palmitate and stearate were dissolved in xylenes and cast onto NaCl disks. Regenerated HA from ester saponification was mixed with KBr and pressed into pellets.

1.5 X-Ray Photoelectron Spectroscopy (XPS). XPS analyses were performed on a PHI 5800 spectrometer (Physical Electronics, Inc., MN). Measurements were taken with an electron takeoff angle of 45° from the surface normal (sampling depth ~50 Å). High-resolution spectra (C1s, N1s) were obtained at a pass energy of 25 eV. Component peak analysis of high-resolution spectra was performed using XPSPeak 4.1 software. HA laurate was dissolved in xylenes and cast into a film on a glass slide for XPS analysis.

1.6 Differential Scanning Calorimetry (DSC) and Thermal Gravimetric Analysis (TGA). The thermal properties of the HA esters were determined using Seiko DSC SCC 2200 differential scanning calorimeter and Seiko TG SCC 5200 thermal gravimetric analysis at a heating rate of 10 C/min in air.

1.7 Synthesis of HA Esters. Compared with native HA, silyl HA-CTA is useful as an intermediate of further modifications of HA, including esterification. The trimethylsilyl groups of silyl HA-CTA are more easily replaced than the active hydrogen in HA hydroxyl groups. Esterification with silyl HA-CTA as a starting material (FIG. 1) was carried out without addition of catalysts, and the reaction took place at a high rate (within 1 hr). The by-product trimethylchlorosilane (TMCS), which has a low boiling point (57° C.), can be evaporated at the reaction temperature (80° C.). Acylation takes place at the oxygen of the trimethylsilyloxy group —O—Si(CH$_3$)$_3$ in the silyl HA-CTA (FIG. 2B). The FT-IR spectrum of HA palmitate is shown in FIG. 3 in comparison with HA-CTA (complex between HA and with cetyltrimethyl ammonium salt) and silyl HA-CTA. The spectra of all HA esters are similar, so the spectrum of HA palmitate is used as a representative. Results indicate the introduction of a large amount of acyl groups with acylation.

The C1s XPS high-resolution spectrum of HA laurate is shown in FIG. 4A. In comparison with silyl HA-CTA (FIG. 4B), the C3 component of the HA ester increases significantly, and its intensity almost doubles that of the C2 peak. In silyl HA-CTA, the C3 peak area is inferior to C2. The increase of C3 peak percentage and intensity relative to C2 in HA laurate can be explained with the introduction of large amounts of ester groups during esterification.

The N1s XPS high-resolution spectra of HA laurate and silyl HA-CTA are shown respectively in FIGS. 5A, 5B. The N1s signal of the ester consists of two components: ammonium salt N$^+$ (402.8 eV) and amide N (399.8 eV). The intensity of ammonium salt N$^+$ signal is smaller than that of amide N signal in the ester sample, but they are almost equal to that observed in silyl HA-CTA. While this might suggest that the acid chloride also attacked -CTA groups during esterification, any such attack was not dominant, because most ammonium salt N$^+$ groups still remain.

1.8 Regeneration of HA from HA Esters. The FTIR spectrum of HA regenerated from saponification of HA caprylate is shown in FIG. 6. The peaks characteristic of absorptions for -CTA and capryloyl esters are gone. There is no difference between the spectra of regenerated HA and original HA, indicating the substantial removal of CTA and ester groups through saponification. Alkaline metal cations (e.g. Na$^+$ and K$^+$) with sufficiently high concentration can displace the CTA groups in HA ester, resulting in a regenerated HA (FIG. 6). A mixture of acetone and ethanol was used for saponification of the HA esters soluble in acetone, including HA esters from caproate to laurate. HA palmitate and stearate are insoluble in acetone, but dissolve in pyridine, so a pyridine-ethanol mixture was used for them.

1.9 Properties of HA Esters. From the TGA data in FIG. 7, it can be seen that HA begins to degrade around 212° C., but no melting point can be found below that temperature in the DSC data (FIG. 7). Each disaccharide unit of HA contains four hydroxyl groups, one amide and one carboxyl group. Due to the strong intra- and inter-molecular hydrogen bonds, HA is highly crystalline and insoluble in organic solvents, and cannot be transformed into the molten state before its decomposition.

Introduction of aliphatic acyl groups to HA disrupted the strong HA intermolecular bonding, reducing the crystallinity and producing appreciable thermoplasticization. For HA laurate, a broad endotherm is observed ranging from 76° C. to 105° C. with a peak at 97.8° C., while HA caproate shows a melting peak starting from 175° C. with the peak at 191.7° C. The TGA results (FIG. 7) show that HA laurate begins degrading at about 191° C., while HA caproate begins degrading at approximately 170° C.

The melting temperature and the starting points of degradation for various HA esters are summarized in TABLE 1. The intermolecular interaction between the polymer chains decreases with increasing length of ester side chains, as indicated by the change in melting points. The higher aliphatic acid chloride more effectively conferred thermoplasticity to HA. Starting from HA caprinate, higher aliphatic esters of HA melt far before the degradation begins, and thus can be melt-processed. Note that, for caproyl and capryloyl: HA caproate and caprylate did not achieve thermal fluidity before the onset of degradation. Degradation points of HA esters depend on the balance between two factors: a decrease in crystallinity (molecular order) and an increase in the length of acyl groups. From HA caproate to palmitate, the effect of acyl group chain length seems to dominate. However, with HA stearate, the effect of molecular order disruption seems to dominate. Thus, esterification with high aliphatic acid chlorides is an effective method for imparting thermoplasticity to HA. HA caprinate, laurate, palmitate and stearate had melting peaks far below their degradation temperatures, providing sizable 'safe-harbor' for thermal melt-processing of the polymers. To the extent acyl groups are not long enough to disrupt the strong HA intermolecular interactions and molecular arrangement (e.g., caproyl and capryloyl), their corresponding HA esters are not hot melt-processable.

The solubility of HA esters were also investigated and the results are summarized in TABLE 2. HA esters from caproate to laurate are soluble in acetone and THF, while palmitate and stearate are soluble in hexane, indicating that the hydrophobicity of HA esters increases with the side chain length. DMSO may not be a good solvent for the HA esters, while xylenes are a good solvent for these esters.

The resultant thermoplastic HA esters can be hot molded into films, sheets, and any desired shapes. They can be used alone or mixed with some other biomedical grade thermoplastics, such as ultra high molecular weight polyethylene. Crosslinkers, such as blocked polyisocyanate, can also be used during molding to obtain a permanent three-dimensional HA ester network (see, also, below discussion). Finally, the acyl groups can be easily removed through saponification in order to return HA to a regenerated state after molding.

2.0 Crosslinking Background: Crosslinking of regenerated HA and unique HA derivatives synthesized according to the invention (see FIG. 1, optional steps identified at 31 and 36 by way of example).

Several different methods are contemplated hereby to crosslink hyaluronan. By controlling the extent of crosslinking, the type of covalent bond and the hyaluronan group involved, it is possible to create a wide range of physically diverse materials from highly viscoelastic solutions to insoluble gels or solids.

2.1 Crosslinking through Hydroxyl Groups.

HYLAN, as referenced above, is a hyaluronan derivative(s) with the hydroxyl groups crosslinked, while leaving the carboxyl and acetamido groups unreacted. Retention of carboxyl groups was important, here, because the polyanionic character of hyaluronan plays a lead role in its physicochemical and biological properties, Balazs et al. HYLAN polymers currently used in medicine are HYLAN A and HYLAN B. HYLAN A is a viscoelastic fluid, developed by Balazs et al. by cross-linking hyaluronan chains to specific protein molecules with formaldehyde during recovery of the polymer from animal tissues.

HYLAN B is synthesized by reacting hyaluronan with divinyl sulphone in aqueous alkaline solutions at room temperature. With this reagent bis-(ethyl) sulphone crosslinks are formed, producing an infinite hyaluronan network that is no longer water soluble. The degree of crosslinking can be controlled to create a wide range of materials that range from soft deformable gels to solid membranes and tubes, with prolonged or permanent residence times.

Polyfunctional epoxy compounds may be used to crosslink hyaluronan in alkali solution with a water-soluble organic solvent present, such as acetone and methanol, which may prevent the HA from decomposing. Depending on the ratio of epoxy compound to HA, different crosslinked polymers can be obtained. Products with a small molar ratio (<10) are soluble, while those with a high ratio (>10) are insoluble.

A similar crosslinked insoluble HA polymer has been developed by Tomihata et al. (1997) through the reaction of poly(ethylene glycol) diglycidyl ether (a diepoxy compound) with HA under acidic or neutral conditions. This crosslinked HA film has good degradation-resistance.

Phosphate-crosslinked HA is a type of ester obtained by esterifying HA with phosphoric acid derivatives, such as phosphoryl chloride ($POCl_3$), in an alkaline medium. This reaction occurs very quickly with gel formation within a few minutes, and the excess of crosslinking agent is easily hydrolyzed and removed, Malson, et al., (1998).

A high degree of HA crosslinking has been achieved by reacting glutaraldehyde (GA) with an HA film in an acetone-water mixture under hydrochloric acid, Tomihata et al., (1997). The intermolecular formation of hemiacetal bonds between GA and the hydroxyl groups of HA led to crosslinking. The crosslinked product tends to be stable in phosphate buffer solution.

Polyisocyanates were used to permanently crosslink HA in anhydrous organic solvents, Balazs et al., (1987), such as acetone, or to immobilize HA coatings on polymeric surfaces. Due to the stability of the urethane linkage, the crosslinked products are durable and can be resistant to decomposition in aqueous solutions. Blocked isocyanates that do not become active until a certain temperature is reached may be used to crosslink and mold the unique HA ester of the invention in a single step such that crosslinking occurs after flow and consolidation.

2.2 Crosslinking through Carboxyl Groups.

In the crosslinking reactions identified above in section 2.1, HA plays the role of a polymeric poly-hydroxyl component. Another category of crosslinked HA derivatives can be obtained through reactions in which HA plays the role of a poly-carboxylic acid.

Ionic crosslinking reactions are possible through the reaction of HA carboxyl groups and polyvalent cations. $BaCl_2$, $CaCl_2$ and $FeCl_3$ were used by Halpern et al. (1989) to treat HA coatings, producing stable products. INTERGEL®, an anti-adhesion product of Lifecore, is a hydrogel of HA formed by chelation with ferric hydroxide.

A polymeric network of HA can also be synthesized via three- or four-component condensation known, respectively, as the Passerini reaction and the Ugi reaction, Crescenzi et al., (1998 & 2003). In the Passerini reaction, a given amount of water-soluble dialdehyde (e.g. glutaraldehyde) and a highly reactive isocyanide (e.g. cyclohexylisocyanide) were added to HA solution with pH 3.5-4.0, which is stirred at room temperature until a gel forms. In Ugi four-component condensation, the mixture contains HA, formaldehyde, cyclohexylisocyanide and lysine ethyl ester. The degree of crosslinking is controlled by the amount of dialdehyde in the Passerini reaction and diamine in the Ugi reaction. Hydrogels obtained from both reactions are transparent and mechanically stable.

2.3 Crosslinking through Both Hydroxyl and Carboxyl Groups.

ACP™ is an auto-crosslinked HA product developed by Fidia Advanced Biopolymer used for adhesion prevention or tissue engineering scaffolds. ACP™ is generated by condensation between the hydroxyl and carboxyl groups of hyaluronan.

A low-water content hyaluronan hydrogel film was made by crosslinking an HA film in an aqueous mixture containing an organic solvent (ethanol or acetone) and a water-soluble carbodiimide (WSC). WSC does not chemically bind to HA molecules, but it mediates the reaction. Ester bonds formed between hydroxyl and carboxyl groups on different HA molecules result in crosslinking.

While certain representative embodiments, examples, and details have been shown merely for the purpose of illustrating the unique HA material and associated method of producing, including any program code utilized to instruct automated manufacturing/fabrication machinery employed to carry out process of producing according to the invention, those skilled in the art will readily appreciate that various modifications, whether specifically or expressly identified herein, may be made to any of the representative embodiments without departing from the novel teachings or scope of this technical disclosure. Accordingly, all such modifications are contemplated and intended to be included within the scope of the claims. Although the commonly employed preamble phrase "comprising the steps of" may be used herein in a method claim, applicants do not intend to invoke 35 U.S.C. §112 ¶6. Furthermore, in any claim that is filed herewith or hereafter, any means-plus-function clauses used, or later found to be present, are intended to cover at least all structure(s) described herein as performing the recited function and not only structural equivalents but also equivalent structures.

What is claimed is:

1. A process for producing a hyaluronan (HA) ester, the process comprising the steps of:
   (a) performing a silylation reaction on an HA-quaternary ammonium complex; and
   (b) performing an acylation reaction on the silyl HA-quaternary ammonium complex using an acid chloride.

2. The process of claim 1 wherein:
   (a) the step of performing a silylation reaction comprises silyating an HA-cetyltrimethyl ammonium salt complex, HA-CTA, producing a silyl HA-cetyltrimethyl ammonium salt complex; and
   (b) the step of performing an acylation reaction comprises introducing the acid chloride having been selected from aliphatic acyl groups consisting of: Hexanoyl, $CH_3(CH_2)_4COCl$; Octanoyl, $CH_3(CH_2)_6COCl$; Decanoyl, $CH_3(CH_2)_8COCl$; Lauroyl, $CH_3(CH_2)_{10}COCl$; Palmitoyl, $CH_3(CH_2)_{14}COCl$; and Stearoyl, $CH_3(CH_2)_{16}COCl$.

3. The process of claim 2 further comprising the step of shaping the hyaluronan(HA) ester by applying thermal energy to melt-process the ester into a structure-shape.

4. The process of claim 2 further comprising the steps of:
   (a) shaping the hyaluronan (HA) ester into a structure-shape; and
   (b) performing a saponification substantially removing acyl groups, $-CH_3(CH_2)_NCO$, and the cetyltrimethyl ammonium salt groups, -CTA, from the hyaluronan (HA) ester to produce a regenerated HA.

5. The process of claim 1:
   (a) wherein the step of performing a silylation reaction comprises silyating an HA-cetyltrimethyl ammonium salt complex, HA-CTA, producing a silyl HA-cetyltrimethyl ammonium salt complex; and
   (b) further comprising the step of performing a saponification substantially removing acyl groups and the cetyltrimethyl ammonium salt groups, from the hyaluronan (HA) ester to produce a regenerated HA.

6. The process of claim 1:
   (a) wherein the step of performing an acylation reaction comprises introducing the acid chloride having been selected from aliphatic acyl groups consisting of: Hexanoyl, $CH_3(CH_2)_4COCl$; Octanoyl, $CH_3(CH_2)_6COCl$; Decanoyl, $CH_3(CH_2)_8COCl$; Lauroyl, $CH_3(CH_2)_{10}COCl$; Palmitoyl, $CH_3(CH_2)_{14}COCl$; and Stearoyl, $CH_3(CH_2)_{16}COCl$; and
   (b) further comprising the step of shaping the hyaluronan (HA) ester into a structure-shape while crosslinking the hyaluronan (HA) ester.

7. A process for producing a hyaluronan (HA) ester, the process comprising the steps of:
   (a) performing a silylation reaction on an HA-cetyltrimethyl ammonium salt complex, HA-CTA; and
   (b) performing an acylation reaction on the silyl HA-cetyltrimethyl ammonium salt complex using an acid chloride selected from the group consisting of: Hexanoyl, $CH3(CH_2)_4COCl$; Octanoyl, $CH_3(CH_2)_6COCl$; Decanoyl, $CH_3(CH_2)_8COCl$; Lauroyl, $CH_3(CH_2)_{10}COCl$; Palmitoyl, $CH_3(CH_2)_{14}COCl$; and Stearoyl, $CH_3(CH_2)_{16}COCl$.

8. The process of claim 7 further comprising the step of:
   (a) shaping the hyaluronan (HA) ester into a structure-shape selected from the group consisting of: a plurality of polymer fibers; a generally solid bulk structure; and porous bulk structure; and
   (b) performing a saponification substantially removing acyl groups and the cetyltrimethyl ammonium salt groups, from the hyaluronan (HA) ester to produce a regenerated HA.

* * * * *